United States Patent [19]

Velling et al.

[11] Patent Number: 4,518,567

[45] Date of Patent: May 21, 1985

[54] REACTOR FOR THE GASIFICATION OF SOLID CARBONACEOUS MATERIALS

[75] Inventors: Günther Velling, Borheim/Hersel; Lothar Schrader, Erftstadt-Liblar; Hermann Schumacher, Bedburg-West, all of Fed. Rep. of Germany

[73] Assignee: Rheinische Braunkohlenwerke AG, Cologne, Fed. Rep. of Germany

[21] Appl. No.: 416,993

[22] Filed: Sep. 13, 1982

[30] Foreign Application Priority Data

Sep. 18, 1981 [DE] Fed. Rep. of Germany ....... 3137136

[51] Int. Cl.³ ............................. B01J 8/24; B01J 8/44; F27B 15/10
[52] U.S. Cl. ......................................... 422/143; 48/77; 239/591; 239/601; 422/145; 422/240; 422/311; 431/7; 431/170; 432/15; 432/58
[58] Field of Search ............... 422/143, 311, 145, 240; 48/62 R, 77, 87; 239/591, 601; 431/7, 170; 432/15, 58; 201/31

[56] References Cited

U.S. PATENT DOCUMENTS

| 2,683,657 | 7/1954 | Garbo . | |
|---|---|---|---|
| 2,826,248 | 3/1958 | Angel | 239/591 X |
| 3,322,521 | 5/1967 | Cockerham . | |
| 3,370,361 | 2/1968 | Guerrieri . | |
| 3,817,280 | 6/1974 | Celani . | |
| 3,888,423 | 6/1975 | Ganiaris . | |
| 4,062,656 | 12/1977 | Blaser . | |
| 4,198,210 | 4/1980 | Worley . | |
| 4,295,817 | 10/1981 | Caplin et al. | 431/7 |

FOREIGN PATENT DOCUMENTS

| 2741805 | 9/1977 | Fed. Rep. of Germany . | |
|---|---|---|---|
| 1111242 | 9/1954 | France . | |
| 101640 | of 1912 | United Kingdom . | |
| 611721 | 11/1948 | United Kingdom . | |
| 690473 | 1/1952 | United Kingdom . | |
| 804365 | 1/1955 | United Kingdom . | |
| 1037082 | 4/1963 | United Kingdom . | |
| 1265770 | 7/1970 | United Kingdom . | |
| 1431763 | 4/1972 | United Kingdom . | |
| 1445809 | 8/1974 | United Kingdom . | |
| 1457700 | 10/1974 | United Kingdom . | |
| 2039458 | 8/1980 | United Kingdom | 422/143 |

Primary Examiner—Barry S. Richman
Assistant Examiner—William R. Johnson
Attorney, Agent, or Firm—Panitch, Schwarze, Jacobs & Nadel

[57] ABSTRACT

In a reactor for gasification of solid carbonaceous materials in a fluidized bed under elevated pressure and at high temperatures using a hot gasification agent, a feed device for the gasification agent is installed in the lower part of the reactor chamber and traverses this chamber in the form of a bridge, which has an arch joined to the walls of the reactor chamber, said arch consisting of refractory brick and supporting a section of metal pipe. The latter is shielded from the outside by the arch and by a top-mounted structure of refractory material. On the inside, the metal pipe is also provided with a tubular lining of refractory material. Metal pipe, lining, and arch have openings for passage of the gasification agent. The size and shape of the openings are selected to assure passage of the gasification agent even if the parts undergo changes in length as a result of the effects of temperature. The metal pipe section also serves to absorb the forces resulting from the positive pressure of the gasification agent inside it, as well as for the purpose of metering and distributing the gasification agent in the interior of the reactor.

20 Claims, 8 Drawing Figures

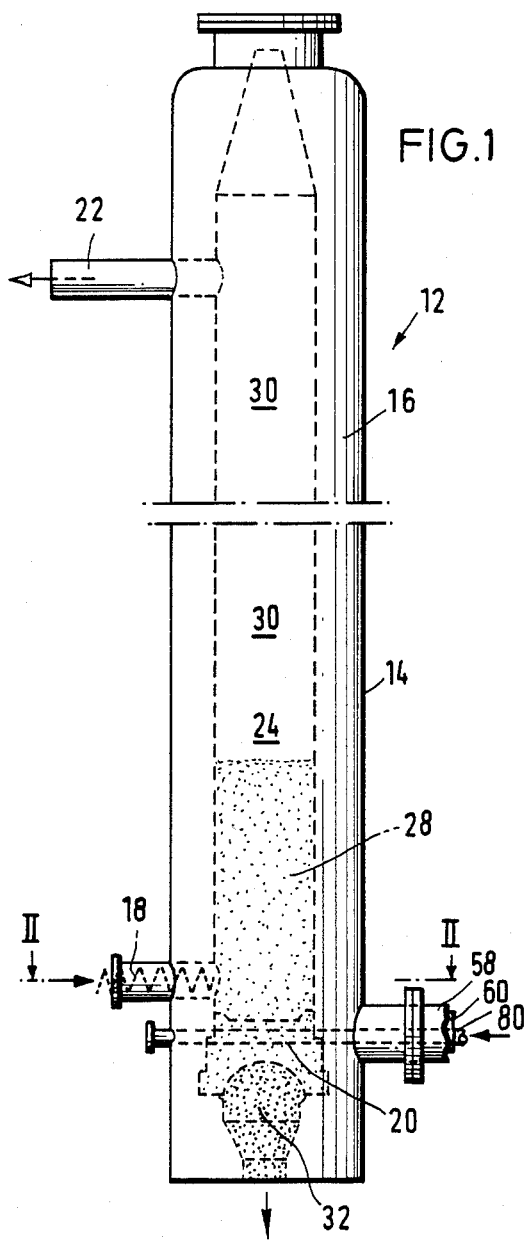
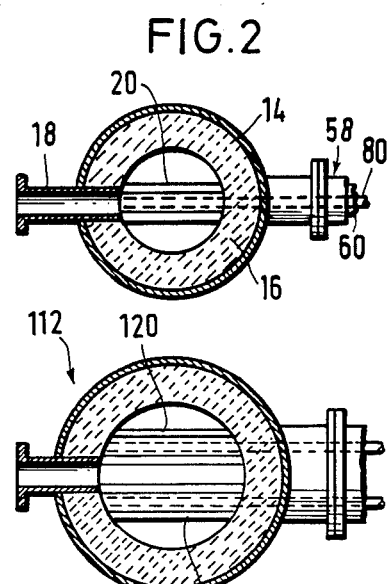

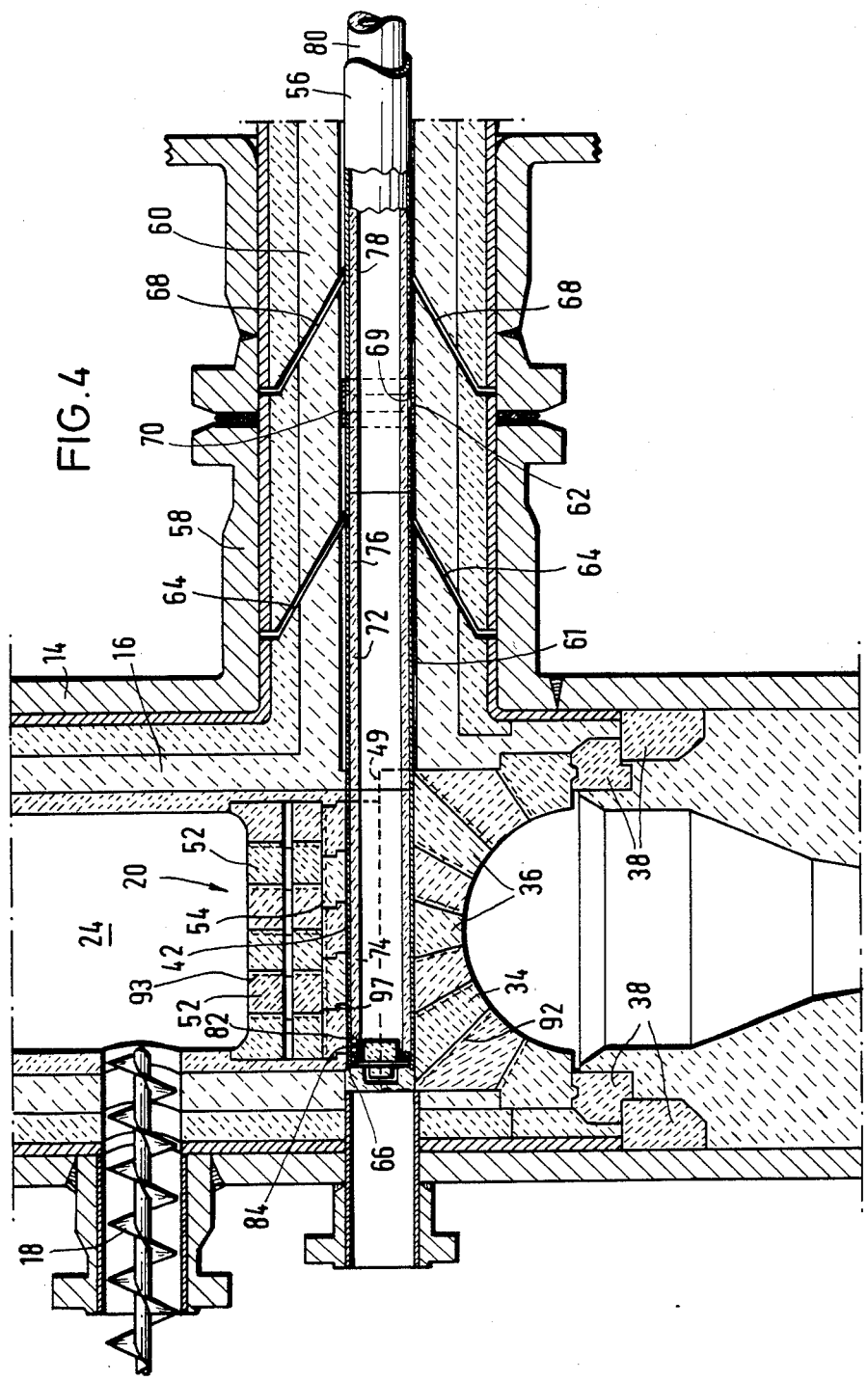

REACTOR FOR THE GASIFICATION OF SOLID CARBONACEOUS MATERIALS

BACKGROUND OF THE INVENTION

The invention pertains to a reactor for the gasification of solid, carbonaceous materials in a fluidized bed under elevated pressure and at high temperatures with a feed device for the hot gasification agent, which has at least one bridge-shaped structure attached in the reactor chamber consisting of ceramic refractory material, inside which there is a pipe line for gasification agent running along the bridge essentially in the longitudinal direction, this line being provided with openings pointing downward and/or to the sides, through which the gasification agent can emerge from the bridge into the reactor chamber.

A reactor of this type is known from U.S. patent application Ser. No. 108,194, filed Dec. 28, 1979, now abandoned, which also lists the essential reasons which make it appear advisable that a bridge-shaped structure of this type be used as a feed device for the gasification agent. It has been found, however, that with a view to the functions assigned to such a bridge-shaped structure, special measures must be taken with regard to its design in order to ensure that the desired effect is achieved under all possible operating conditions. This applies primarily with respect to high temperatures, which can be as high as 1,200° C. and more. Metallic materials are not able to withstand such permanent stress over weeks and months, so that the use of refractory ceramic materials is required. However, these do not guarantee gas-tightness, especially since a structure of this type is composed of brick-type ceramic elements. One of the essential preconditions for the achievement of optimum operating conditions is, however, a specific distribution of the hot gasification agents over the cross-section of the reactor chamber, which at the same time also effects the fluidization of the fluidized bed. This results in the requirement that the points at which the gasification agent enters the reactor as well as the amounts of gasification agent per unit of time must be established within certain limits and maintained there.

This would not be possible if the bridge-shaped structure were to consist of ceramic parts exclusively, since, even though the individual bricks of ceramic material were held together by mortar, cracks, gaps, etc. would necessarily occur over the course of time, through which the gasification agent would pass in and out of the reactor chamber in a way which could not be controlled with respect to location or quantity. In addition, within the bridge-shaped feed device, the gasification agent must be under a pressure that is higher than the pressure prevailing in the reactor chamber, so that there is a pressure difference between the line inside the bridge-shaped structure and the reactor chamber. If no special measures are taken, this would result in the creation of forces which would act on the bridge-shaped structure. This would be a definite disadvantage, since the installation would have to be constructed with significantly more strength, e.g. to withstand the pressure forces acting laterally and upwards as well.

One of the purposes of the invention is to design a reactor of the above-described type in such a manner that satisfactory long-term operation can be guaranteed even at very high temperatures and at pressures of up to 120 bar or more, namely with respect to gasification agent distribution that takes into account the technical requirements of both flow and gasification, as well as to design the bridge-shaped installation and the conduit contained therein which would be as simple as possible and require minimum maintenance.

SUMMARY OF THE INVENTION

In order to solve this problem, the invention proposes that the lower region of the bridge-shaped structure consist of refractory brick assembled to form an arch, that the two ends of the arch rest on the lining delimiting the reactor chamber, that on the arch, there be a metal pipeline lined with ceramic material and provided with appropriately positioned openings, that the ceramic material also be provided with the appropriately positioned openings, and that the metal pipeline be shielded with ceramic material on the outside on all sides, at least in the area of the reactor chamber. For this purpose, the arch should preferably be designed as a semicircular barrel vault. Its purpose is to provide the structure with the necessary static strength and stability of shape, so that there is no need to provide additional reinforcement inserts in order to achieve the required supporting capacity.

Preferably, the upper side of the arch should be essentially horizontal, as seen from the side. One design has been found particularly advantageous, namely where the cross section of the upper side of the arch is developed with a longitudinal recess, the cross-sectional dimensions of which are adapted to those of the metal pipeline, so that the latter can be accommodated in this recess. If the cross-section of the recess is semi-circular, its delimiting walls would thus protect the metal pipeline over half of its circumference from the direct action of the high temperatures prevailing in the reactor chamber. Furthermore, the arch can support a top-mounted structure of ceramic material which shields the upper side of the metal pipeline, said structure also being provided with a longitudinal recess corresponding to the recess on the top of the arch in respect to dimensions and positioning, so that the upper half of the metal pipeline is protected against the outside by means of this top part. In this execution, the actual arch and the top-mounted structure resting thereupon will delimit a channel with essentially circular cross-section, within which the metal pipeline is located, which may, ultimately, be regarded as a metallic lining of this channel.

The function of the metal pipeline is to establish those points or areas at which the gasification and fluidizing agent enters the reaction chamber. In addition, it also has a metering function, since the number and the size of the openings made in the metal pipeline determine, as a function of the pressure conditions, the amount of gasification agent entering the reactor chamber per unit of time. Another important function of the metal pipeline is its effect as a pressure vessel, the walls of which absorb the forces resulting from the abovementioned pressure differential and thus relieve the ceramic structures, i.e. particularly the arch and the top-mounted structure from these forces. This makes it possible to eliminate bracing for the arch or the top-mounted structure which serve merely to dissipate the forces resulting from the pressure differential. The two abutments conventional for arches are therefore sufficient for transmitting the weight of the installation to the reactor walls.

The ceramic lining of the abovementioned metal pipeline serves to protect the conduit from the immediate effect of the gasification agent which enters the pipleline at high temperatures. Furthermore, this lining, which preferably consists of at least one tubular piece of ceramic material loosely inserted into the pipeline, also has a certain support function, so that the function of the metal pipeline will not be impaired due to changes in shape due to overheating. The lining may also consist of several tubular pieces, which are inserted into the metal pipeline until they abut one another. In this case, it is not necessary to maintain accurate dimensions. However, it may be advantageous to fix the metal pipeline, on one hand, and, on the other hand, the inserted pipe section(s) at least in that area in which the two are provided with openings for the passage of the gasification agent, so that the openings in the pipeline and in the lining retain their positions relative to one another.

In view of the different expansion coefficients of ceramic material on one hand and, on the other hand, of metal, particularly steel, the invention also anticipates the possibility that in one of the two pipes of different materials, the openings for the passage of gasification agents be designed to be larger, preferably in the form of a slot, than those of the other pipe. Since the metal pipe, due to the ease and accuracy of processing thereof as well as to its density, will generally function as the metering pipe, the cross sections of the openings therein, preferably executed as round holes, will determine the quantity of gasification agent per unit of time as a function of the pressure conditions. Accordingly, the openings in the ceramic tube can advantageously have a larger cross-sectional area, so that, even though there may be a relative displacement between the ceramic pipe and the metal pipeline, the openings of the latter will always be positioned opposite a corresponding opening area in the ceramic pipe. The extent of difference between the dimensions of the openings, particularly in the length of the longer axis of the slot, can easily be calculated on the basis of the occurring temperature differences and the expansion coefficients. Preferably, the openings for the passage of gasification agent in the arch portion should likewide be larger than those in the metal pipeline.

It has been found to be particularly advantageous to connect at least some of the individual bricks forming the arch and/or top-mounted structure in a form-locking manner by means of slot and key connections, or projections, particularly at their adjacent surfaces. In this way, it is possible to eliminate the use of mortar to join the bricks. Furthermore, the form-locking connections also serve as labyrinth seals, reducing the gas permeability of the ceramic parts of the bridge-shaped structure. Naturally, it is also possible to provide both alternatives, namely slot and key connections as well as additional mortar. The selected type of form-locking connection is, however, of particular importance for obtaining stability of shape of the installation. This stability of shape is indispensable if, due to operational conditions, or, as a consequence of deactivations of the reactor and subsequently occurring expansion conditions, the installation will repeatedly return to its original, predetermined shape.

For the purposes of illustrating the invention, there are shown in the drawings forms which are presently preferred; it being understood, however, that this invention is not limited to the precise arrangements and instrumentalities shown.

BRIEF DESCRIPTION OF THE DRAWINGS

FIG. 1 is a schematic view of a gasification reactor of the type to which the present invention pertains;

FIG. 2 is a section along the line II—II of FIG. 1, showing one embodiment of the present invention;

FIG. 3 is a view of a second embodiment, corresponding to the representation in FIG. 2;

FIG. 4 is a larger scale longitudinal section through the gasifier area of the reactor encompassing the feed device for the gasification agent;

DETAILED DESCRIPTION OF THE PREFERRED EMBODIMENTS

Figure 5:
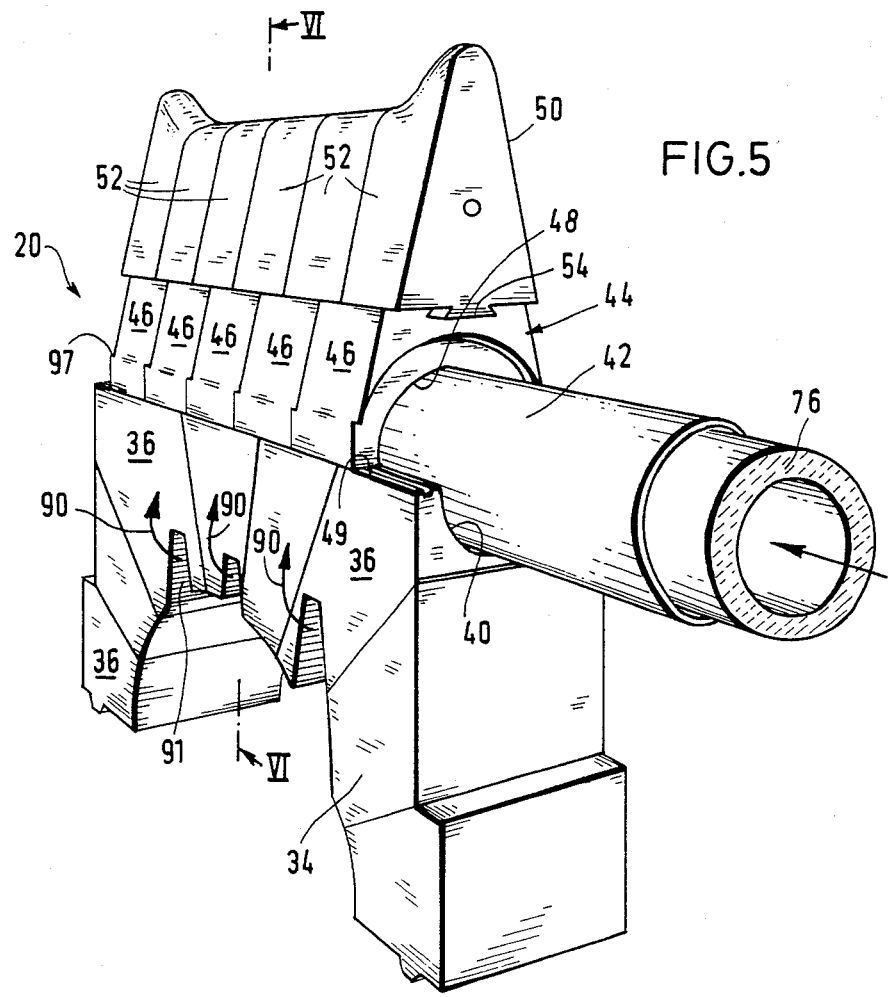
FIG. 5 is a perspective view of exclusively those portions of the gasifier area constituting the feed device.

In accordance with the representations in FIGS. 1 through 4, the reactor 12 consists essentially of a fixed housing 14, the inside of which is provided with a lining 16 of refractory material, a feed device 18 for the carbonaceous material to be gasified, and a feed device 20 for the hot gasification agent. The product gas is removed from the reactor chamber 24 through the line 22. The feed device 18 for the carbonanceous material to be gasified can be designed as a feed screw or in some other suitable manner, e.g. a slanted pipe through which the material flows obliquely downwards into the reactor chamber 24 by the force of gravity. The feed device 20 for the gasification agent is located on a level below that where the feed device 18 is located. Under the influence of the upward flow of the gasification agent from the feed device 20, a fluidized bed 28 forms in the lower region of the reactor chamber 24, in which the desired reaction occurs between the carbon and the gasification agent, preferably hydrogen. Obviously, this does not exclude the possibility that additional reactions occur between the gasification agent and carbonaceous material as well as between the gasification products and the latter and possibly between the products themselves in the secondary reaction chamber 30, which is located above the fluidized bed 28.

The solid gasification residues 32 from the fluidized bed 28 collect in the area beneath that plane at which the gasification agent is supplied. The gasification residues 32 are removed from the reactor 12 into a cooling device, which is not represented in the drawing, e.g. in accordance with U.S. Pat. No. 4,288,294.

Details of the design of the feed device 20 for the gasification agent can be seen in FIGS. 4 through 8. FIG. 4 shows that the lining 16 on the inside of the housing 14 may consist of several layers of different materials. However, this is of no relevance to the invention.

The feed device 20 consists of a structure rigidly mounted in the reactor chamber 24, extending radially across the cross-section of the reactor in the embodiment shown in FIGS. 1, 2, and 4 through 8. Its lower part consists of an approximately semicircular barrel vault 34, which is composed of several bricks 36. The bricks may be joined without mortar. The abutments 38 supporting the barrel vault are located in the lining of the reactor 12 and are, if so required, parts of said lining.

The bricks 36 of the arch are positioned and shaped in such a manner that the side view of the arch 34 (FIG. 4) has an essentially horizontal profile at the top. On the top side, the bricks constituting the horizontal contour are provided with a recess resulting in a trough-like channel or recess 40 with a semicircular cross section and essentially horizontal, inside which there is a section of metal pipe 42, preferably steel. Within the region of the feed device 20, the lower half of this pipe section 42 is shielded against the outside, i.e. against the reactor chamber 24, by means of the bricks 36 provided with the abovementioned recesses. The upper half of the pipe section 42 is protected by refractory bricks 46 forming a top structure 44. This top structure 44 is also supported by the barrel vault. As can be seen particularly from FIGS. 5 and 6 of the drawing, the bricks 46 are also provided with semicircular recesses which form a trough-like channel or recess 48 serving to complement the recess 40 in the bricks 36. The bricks 46 extend around the pipe section 42, so that on the side, they are braced next to the pipeline on the upper side of the barrel vault 34. Particularly FIGS. 5 and 6 reveal that there is a slot and key connection 49 between the bricks 36, on one hand, which form the horizontal upper contour, of the arch 34 and, on the other hand, the bricks 46 of the top structure 44, which connection guarantees a form-locked joint and, consequently, a satisfactory connection of the bricks 36 and 46 to one another in the case of mortarless joining, but it also prevents a direct heat effect on the pipeline section 42 through the joints between the bricks 36 and 46.

The top structure 44 supports an additional layer 50 of bricks 52, which taper sharply upwards. Here, as well, a slot and key connection 54 is provided between the top structure 44 and the additional brick layer 50, which, in the present embodiment, is designed as a dovetail.

Essentially, the purpose of the tapering is to make the top side of the feed device 20 so narrow that no solid particles can be deposited there. Furthermore, the upward tapering cross section favors the technical flow characteristics inside the reactor chamber 24.

It is also possible to design the feed device 20 from 1 layer of bricks and to form, by means of corresponding openings in the brick, the channel constituted by the recesses 40 and 48 to accommodate the metal pipeline 42. However, a multilayer design is preferred for this installation for production reasons. The pipe section 42 is connected by means of a conduit 56 to a source of hot gasification agent, e.g. hydrogen or a gas containing hydrogen. As can be seen particularly from FIGS. 1 and 4, at the level of the feed device 20 for the hot gasification agent, the housing 14 of the reactor 12 is provided, on its outside, with a projection 58, the inside of which also has a lining 60 of refractory ceramic material, which accommodates the metallic connection conduit 56. The design of the embodiment represented in the drawing, particularly in FIG. 4, has been selected so that the metallic pipeline section 42 extends over the actual feed device 20 into the projection 58, whereby the area 61 located there is provided on the outside, near the end 62 facing away from the feed device 20, with rigidly attached metal mounts 64, which are embedded in the lining 60 of the projection 58 and thus fix the position of the pipeline section 42 near its end 62. This means that the changes in length due to thermal effects of the section 42 and the area 61 which is joined thereto in one piece will basically occur between, on one side, the mounts 64 and the free end 66 of the pipeline section 42. For this reason, this end 66 is mounted inside the feed device 20 or the adjacent lining 16 in such a manner that it can move freely in the longitudinal direction to the extent required. The connection conduit 56 is likewise fixed by means of mounts 68 in the vicinity of its end 69 facing the feed device 20, so that the changes in length caused by thermal effects will essentially occur towards the other side. The connection between the connection conduit 56 and the pipeline area 61 is executed by means of a pipe section 70, overlapping the ends of the conduit 56 and the area 61 like a telescope, so that here as well there is a possibility for changes of length on the basis of temperature effects. In both cases, the mounts 64 and 68 are designed as a peripheral conical plate, which is welded to the pipe section in question at the area of its smallest diameter and is solidly anchored in the area of its greatest diameter to the reactor wall or in the reactor housing. This design is a simple way of fixing the pertinent pipe section in an axial direction, so that, on one hand, the position of the pipe section is secured while, on the other hand, allowance is made for unimpeded change of length due to temperature changes.

The entire metal pipeline consisting of the pipeline section 42 and the area 61, which is joined thereto to form one piece, as well as the pipe section 70 and the connection conduit 56, is lined on the inside with a tubular lining 72 of refractory material. This lining consists of individual pipe lining sections 74, 76, 78, 80, which are loosely inserted in the metal pipeline. It can be seen, particularly from FIG. 4, that the individual pipe sections 74 through 80 form butt joints with one another. No special measures are required to attach these sections 74 through 80. On the contrary, these rest loosely in the corresponding sections of the metal pipeline. Only that pipe lining section 74 which is located inside the metal pipeline section 42 in the feed device 20 and which consists of refractory material, is secured against turning around the longitudinal axis in relation to the corresponding metallic pipeline section 42. For this purpose, the pipe lining section 74 of ceramic material is provided on the outside, near its free end, with a recess or flattened area 82, upon which rests a lug 84 located on the inside of pipe section 42, said lug running transversely to the longitudinal axis. In this manner, a relative turning movement between the metal pipeline 42 and pipe lining section 74 is prevented. The flattened area or recess 82 is long enough that a longitudinal displacement of the lug 84 in relation to the pipe lining section 74 which can be caused by different changes in length due to the effects of temperature, is possible.

Figure 6:
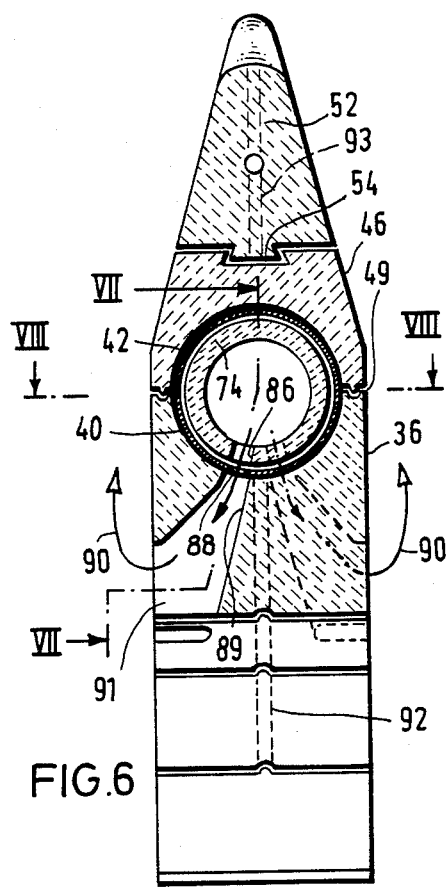
FIG. 6 is a section along the line VI—VI in FIG. 5.
Figure 7:
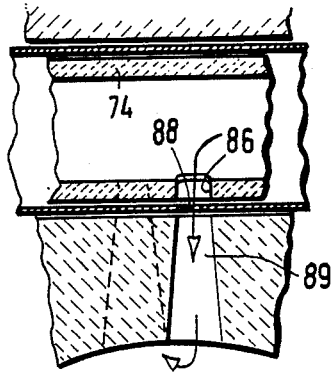
FIG. 7 is a section along the line VII—VII in FIG. 6.
Figure 8:
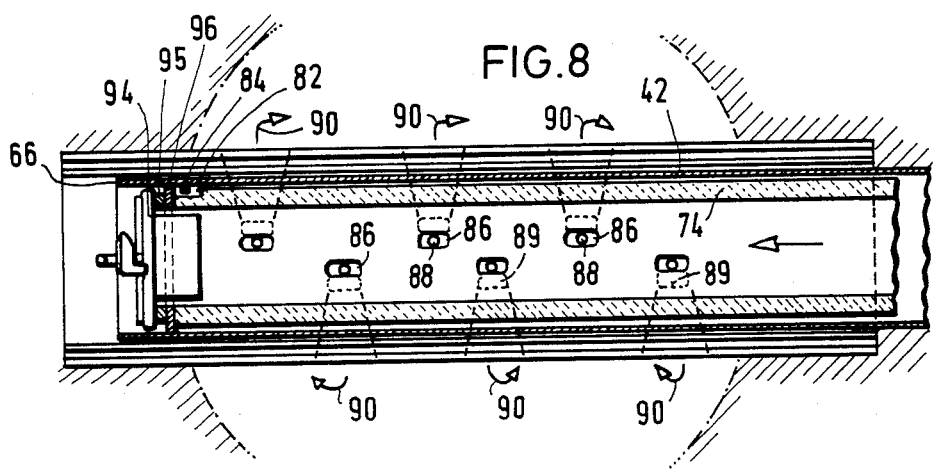
FIG. 8 is a section along the line VIII—VIII in FIG. 6.

The locking system described above for preventing relative rotation between the metal pipeline 42 and pipe lining section 74 takes into account the fact that inside the feed device 20 both sections 42 and 74 are provided with openings for the passage of the gasification agent. Particularly the FIGS. 6 through 8 show that these openings are provided in the lower region of the metal pipeline 42 and pipe lining section 74, and that they are executed as slots 86 in the pipe lining section 74 of refractory material and as round holes 88 in the metal pipeline section 42. Thereby, the function of the holes 88 in the metal pipeline section 42 is to meter the gasification agent and allow the agent to enter the reaction chamber 24 in the desired manner, distributed over the length of the feed device 20. The design of the openings 86 in the pipe lining section 74 of refractory material takes into account the fact that the metal pipeline 42 and pipe lining section 74 undergo different changes in length when changes in temperature occur. Precise dimensioning of the openings 86 is not required, since the metering function is assigned to the holes 88 in the pipeline section 42. The latter also applies to the openings 89 in the barrel vault 34, or the bricks 36 that form this vault. These openings 89 are also designed as slots, the form and size of which at the end facing the metal pipeline section 42 should preferably correspond to the form and size of the slots 86 in the pipe lining section 74. In the direction towards the outer wall of the barrel vault 34 of the bricks 36 forming the same, the openings become wider, whereby they are directed so that they emerge laterally from the feed device 20 or its barrel vault 34, as indicated by means of the arrows 90 in FIGS. 5 through 8. From the pipe section 42 to the outside of the barrel vault 34, the openings 89 become channels 91 with a greater cross section, the progression and cross-sectional size also may be determined by technical considerations relating to flow characteristics. The fact that the gasification agents exit on both sides of the feed device 20 or from the latter at both sides of the vault 34, is taken into consideration in the positioning of the openings 86, 88, and 89, which are located on both sides of the vertical longitudinal plane passing through the center of the pipeline section 42, in the lower region and opening downwards, so that they do not clog, and also positioned with a displacement opposite one another, whereby a particularly good distribution of the gasification agent in the reactor chamber 24 is obtained. The size and number of the holes 88 in the metal pipeline section 42 are selected so that the total of all cross-sections is smaller than the cross sectional area of the pipeline section 42 or the preceding feed line. Thus, a certain positive pressure builds up within the pipeline section 42, which causes a uniform exit of the gasification agent through all openings 88.

All bricks constituting the feed device 20 are joined with the adjacent brick by means of a slot and key joint in a form-locking manner, as is indicated e.g. in FIGS. 4 and 6 of the drawing, at 92 and at 93. As can clearly be seen in FIGS. 4 and 5, the bricks 46 also overlap one another in a roof-like fashion by means of projections 97. As a rule, the bricks constituting the feed device 20 have as many projections and grooves as possible on adjacent surfaces. This precaution provides the installation with a high expansion capacity in all directions and ensures that it returns to its original shape when contracting due to a drop in temperature.

The metallic pipeline 42 and the pipe lining section 74 of refractory material accommodated therein have a removable seal at the end facing away from the connection conduit 56. This is accomplished by means of a sealing disk 94 which, with the interposition of a gasket-seal 95, rests against an inner flange 96, which is welded to the pipeline section 42 close to its free end 66.

Naturally, it is possible to feed the gasification agent through this end of the pipeline 42 as well. However, this is generally not necessary, so that there is a possibility, after removing the sealing disk 94, to insert e.g. a TV camera through this end and thus visually check the condition inside the line.

In the embodiment according to FIG. 3, two feed devices 120 are located inside the reactor 112, each one of them designed as the feed device 20 of the embodiment according to FIG. 1. The embodiment according to FIG. 3 would be applicable particularly for a reactor with very large diameter or cross section, this in order to obtain as uniform distribution as possible of the gasification and fluidization medium over the cross section in spite of the large dimension of the cross section. In both embodiments, the feed devices 20 and 120 occupy only part of the cross sectional area, so that the solid gasification residues can pass the feed devices 20 and 120 in a downward direction to arrive in that area where, according to the representation in FIG. 1, the solid gasification residues are collected. In the case of the embodiment according to FIG. 2, the feed device runs along the diameter of the reactor cross section. In the case of the embodiment according to FIG. 3, the two feed devices 120 extend along two parallel chords of the cross section. The feed device 18 for the solid carbonaceous material to be gasified runs essentially parallel with the feed devices 20 and 120, whereby it is aligned with the feed device 20 in the case of FIG. 2.

The reactor according to the invention is particularly suitable for hydrogenating gasification under high pressure, whereby hydrogen or gas containing hydrogen is introduced into the reactor under high pressure and at high temperature. However, the invention can also be applied to other gasification procedures and for introduction of other gasification agents, e.g. oxygen and/or steam. The disclosure contents of U.S. patent application Ser. No. 108,194, filed Dec. 28, 1979, now abandoned is incorporated in this application by reference.

The present invention may be embodied in other specific forms without departing from the spirit or essential attributes thereof and, accordingly, reference should be made to the appended claims, rather than to the foregoing specification as indicating the scope of the invention.

We claim:

1. Reactor comprising a reactor chamber having walls for gasification of solid carbonaceous materials in a fluidized bed under elevated pressure and high temperatures, with a feed device for a hot gasification agent, at least one bridge-shaped structure of refractory material installed in the reactor chamber, a conduit located inside the bridge-shaped structure running essentially in the longitudinal direction of the bridge-shaped structure for conveying the gasification agent, the conduit being provided with openings through which the gasification agent can pass from the conduit through the bridge-shaped structure into the reactor chamber, wherein said bridge-shaped structure contains a lower portion of the bridge-shaped structure (20, 120) consisting of refractory bricks (36) assembled to form a self-supporting arch (34), opposite ends of the arch (34) being braced on corresponding opposite inner walls of the reactor chamber (24), the conduit comprising a metal pipeline (42) within the bridge-shaped structure, the metal pipeline being lined on the inside with refractory material (74) which also has openings (86) which correspond to the openings (88) in the metal pipeline at least in the area of the reactor chamber (24), the entire outer surface of metal pipeline (42), except the areas adjacent the openings in the conduit, being shielded by the refractory material of the bridge-shaped structure.

2. Reactor according to claim 1, characterized by the arch (34) being a semicircular barrel vault.

3. Reactor according to claim 1 or 2, characterized by the longitudinal crosssection of the arch (34) having an essentially horizontal top contour.

4. Reactor according to claim 1 or 2 characterized by the top side of the arch (34) being provided in cross-section with a longitudinal recess (40), the cross-sectional dimensions of which are adjusted to those of the metal pipeline (42).

5. Reactor according to claim 1 or 2 characterized by the metal pipeline (42) located within the bridge-shaped structure extending in one integral part with at least at one end further extending into an area (61) which constitutes the connection with a feed line (56) for gasification agent by means of a mount (64) in the surrounding masonry (60).

6. Reactor according to claim 1 or 2 characterized by the inside lining of the metal pipeline (42) consisting of at least one pipe lining section (74) of refractory material, loosely inserted into the pipeline (42).

7. Reactor according to claim 6, characterized by the metal pipeline (42) and each of the pipe lining sections (74) of refractory material inserted therein being fixed in relation to each other in peripheral direction, at least in that area where both are provided with openings (86, 88).

8. Reactor according to claim 1 or 2 characterized by the feed device (18) for the solid carbonaceous material to be gasified extending in a parallel position to the bridge-shaped structure (20, 120) for feeding the gasification agent.

9. Reactor according to claim 8, characterized by the feed device (18) for the solid carbonaceous material to be gasified being positioned in the same vertical plane as the bridge-shaped structure (20, 120) for feeding the gasification agent.

10. Reactor according to claim 1 or 2, characterized by the corresponding openings (86, 88) in one of either the pipeline or the pipe lining section having a greater cross section than the openings in the other of the metal pipeline and the pipe lining section so as to compensate for different changes in the length of the the metal pipeline and the pipe lining sections.

11. Reactor according to claim 10, characterized by the openings in the pipe lining section (74) having the greater cross-section.

12. Reactor according to claim 11, characterized by the openings (86) in the pipe lining section (74) of refractory material being designed as slots, the longer axis of which runs in the longitudinal direction of the pipeline.

13. Reactor according to claim 12, characterized by the dimensions of the slots (86) in the circumferential direction of the pipe lining section (74) approximately corresponding to the diameter of the openings (88) in the metal pipeline (42).

14. Reactor according to claim 1 or 2 characterized by the arch (34) supporting a top-mounted structure (44) of refractory material which shields the top side of the metal pipeline (42), the underside of said top structure, in a cross section view, being provided with a longitudinal recess (48), the cross sectional dimensions of which correspond to those of the metal pipeline (42).

15. Reactor according to claim 14 characterized by the top structure (44) in cross section being tapered upwards.

16. Reactor according to claim 14, characterized by the top side of the arch (34) and the under side of the top structure (44) delimiting a channel which, in a cross sectional view, is essentially circular, and within which the pipeline section (42) is accommodated.

17. Reactor according to claim 16 characterized by at least some of the bricks (36, 46, 52) of at least one of the arch (34) and top structure (44) being connected to one another by means of refractory mortar.

18. Reactor according to claim 14, characterized by the individual bricks (36, 46, 52) of at least one of the arch (34) and top structure (44, 50) being joined in a form-locking manner with each other in at least part of the surfaces facing one another.

19. Reactor according to claim 18 characterized by at least some of the bricks (36, 46, 52) of at least one of the arch (34) and top structure (44) being connected to one another by means of refractory mortar.

20. Reactor according to claim 18 characterized by the form-locking manner comprising a slot and key connection.

* * * * *